H. F. TOWNER.
VEHICLE CONSTRUCTION.
APPLICATION FILED JAN. 10, 1921.
1,397,747.
Patented Nov. 22, 1921.
2 SHEETS—SHEET 1.
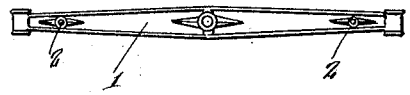
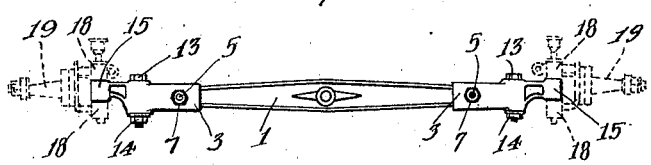
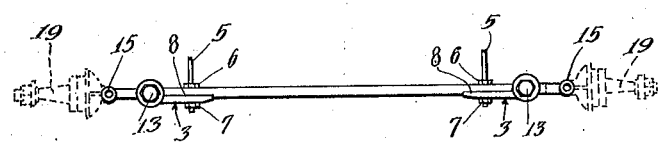
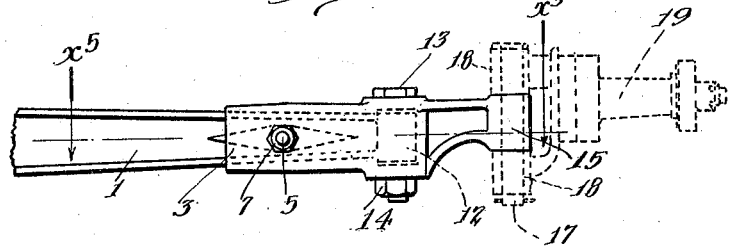
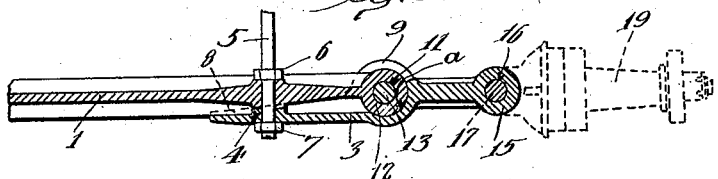
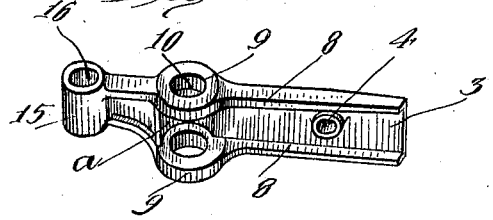
INVENTOR.
Heber F. Towner
BY Frederick Whyou
ATTORNEY

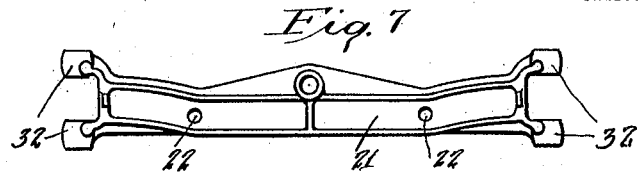
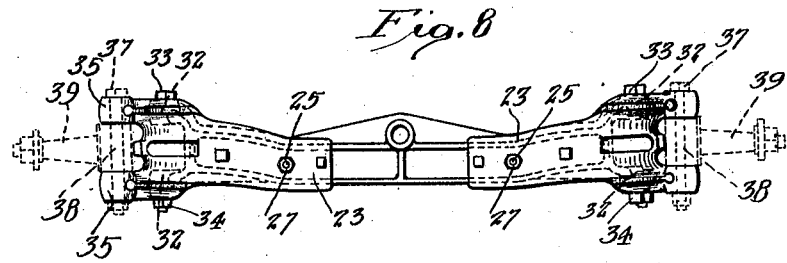
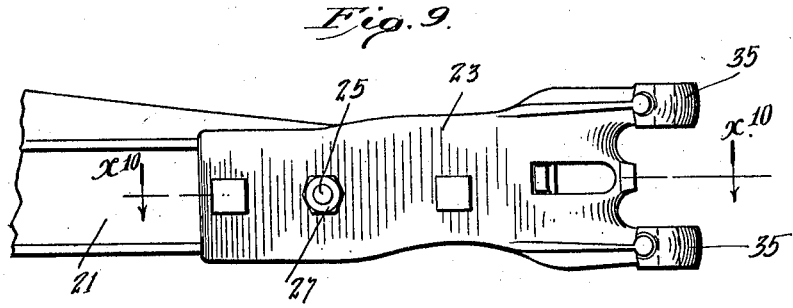
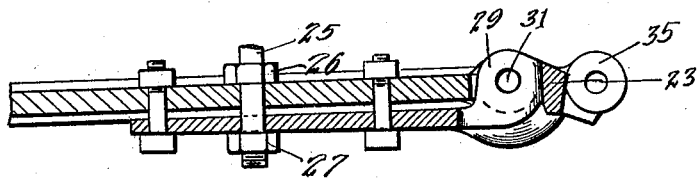
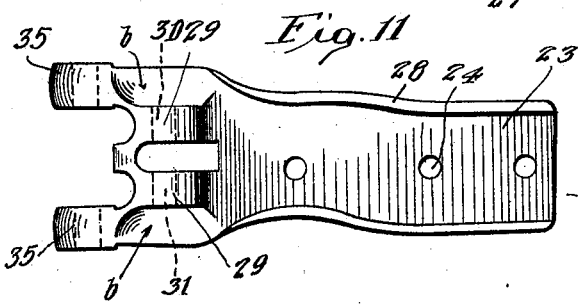

UNITED STATES PATENT OFFICE.

HEBER F. TOWNER, OF SANTA ANA, CALIFORNIA.

VEHICLE CONSTRUCTION.

1,397,747.   Specification of Letters Patent.   Patented Nov. 22, 1921.

Application filed January 10, 1921. Serial No. 436,136.

*To all whom it may concern:*

Be it known that I, HEBER F. TOWNER, a citizen of the United States, and a resident of Santa Ana, in the county of Orange and State of California, have invented certain new and useful Improvements in Vehicle Construction, of which the following is a specification.

This invention relates to certain structural features in a vehicle, whereby the gage of the vehicle may be altered. The invention is especially useful in changing the gage of tractors so that they may be used in agricultural operations upon differently spaced rows of plants. The spacing or gage of the rows of different kinds of plants varies, and it is to facilitate the operation of the tractor between the rows of different kinds of plants that the invention is more especially useful.

One of the objects of the invention is to provide axle extensions of simple construction capable of being quickly placed in position on the axle or removed therefrom.

The accompanying drawings illustrate two different forms of the invention as at present employed by me.

Figure 1 is a front elevation of an axle of a well known type of tractor.

Fig. 2 is a front elevation of the axle shown in Fig. 1 and provided with the improved extensions, the steering knuckles and axle stubs being shown in broken lines.

Fig. 3 is a plan view of Fig. 2.

Fig. 4 is an enlarged front elevation of one end portion of the axle, showing one of the extensions in place thereon, the associated steering knuckle and axle stub being shown in broken lines.

Fig. 5 is a plan section on the line indicated by $x^5$—$x^5$, Fig. 4.

Fig. 6 is a perspective view of the right hand axle extension shown in Fig. 4, looking at the rear face thereof.

Fig. 7 is a front elevation of another well known type of tractor axle.

Fig. 8 is a front elevation of the axle shown in Fig. 7 and provided with a different form of the improved extension than those shown in Fig. 2, the steering knuckles and axle stubs being shown in broken lines.

Fig. 9 is an enlarged front elevation of one end portion of the axle in Fig. 7, showing one of the extensions in place thereon.

Fig. 10 is a plan section on the line indicated by $x^{10}$—$x^{10}$, Fig. 9.

Fig. 11 is an enlarged rear elevation of the right hand axle extension shown in Fig. 8.

First considering the form of the invention shown in Figs. 1 to 6, inclusive, 1 indicates the flanged front axle of a well known type of tractor, known to the trade as the "Fordson" tractor. This axle is provided near its opposite ends with orifices 2 to receive the ends of the radius rod which are generally threaded to receive the nuts for holding the radius rod in place.

It will not be necessary to describe both axle extensions, since they are alike in every respect excepting that they are complementary to one another, one being a left hand extension and the other a right hand extension. Each extension is constructed as follows: There is provided a flanged or channel-shaped member 3 having a hole 4 to receive one end of the radius rod indicated at 5 in Fig. 5. Nuts 6, 7 on the radius rod not only secure the radius rod to the axle but also detachably fasten the member 3 to the axle.

The flanges 8 of the member 3 are spaced to receive the axle between them and thus they embrace the axle, preventing any tendency of the member 3 to slide up or down relative to the axle. The flanges 8 form intermediate of their ends annular members 9, the bores 10 of which are axially alined with each other and with the bore 11 of the knuckle-pin bearing 12 of the axle. This bearing 12, in the ordinary assembly of the axle and steering knuckle, receives the steering knuckle-pin or pivot in a manner well understood in the art pertaining to such devices. In this instance a bolt 13 is engaged with the bores 10, 11 and is secured in place by the nut 14. The member 3 is provided with a curved face $a$ fitting along one side of the bearing 12, thus to add to the rigidity of the construction.

The member 3 is provided at one end with a knuckle-pin bearing 15 of the same length as the knuckle-pin bearing 12, the bore 16 of the bearing 15 receiving the knuckle-pin or pivot indicated in broken lines at 17. The pivot 17 passes through the two knuckle bearings indicated in broken lines at 18, and the axle stub is indicated in broken lines at 19. When the axle extension plates 3 are in place, as shown in Fig. 2, the gage of the tractor is increased by a distance equal to twice the distance between the axes of the bores 10, 16 of either one of the axle extensions.

When it is desired to use the tractor with its original gage, one end of the front axle will be jacked up by any of the usual means employed for such purposes, and at the raised end the knuckle pivot 17 will be removed so as to detach the associated steering knuckle and the wheel mounted thereon from the axle extension. Then the nuts 7, 14 will be removed and the bolt 13 drawn out of the bearing 12. This enables the plate 3 to be detached. Then the steering knuckle will be placed in position to aline its bearings 18 with the bearing 12 and the knuckle pin 17 will be slipped through said bearings to pivotally connect the steering knuckle directly to the axle, this being the original relation of the axle and steering knuckle as the tractor is constructed by the manufacturer.

Now referring more particularly to Figs. 7 to 11, inclusive, of the drawings, another form of the invention is constructed as follows: The flanged axle, indicated at 21, corresponds to the front axle of a well known type of tractor, known to the trade as the "Samson" tractor. This axle 21 is provided with orifices 22 to receive the ends of the radius rod in the same manner as hereinbefore described. Each of the axle extensions in this form of the invention comprises a flanged plate 23 provided with a hole 24 to receive one end of the radius rod, indicated fragmentarily at 25 in Fig. 10 of the drawings. The radius rod is secured to the axle and likewise the plate 23 is secured to the axle by nuts 26, 27 threaded onto the radius rod.

The flanges 28 of the plate 23 form a pair of spaced annular members 29 similar to the annular members 9, excepting that the members 29 are placed sufficiently close to each other to permit of their insertion between the knuckle-pin bearings 32 on the ends of the axle. A bolt 33 engages the bores 30 and 31 and the nut 34 holds the bolt securely in place. The plate 23 is provided with curved faces b fitting along one side of the bearing 32, thus to add to the rigidity of the construction.

At one end, the member 23 is provided with a pair of spaced knuckle-pin bearings 35, the bores 36 of which are adapted to receive the knuckle pin 37 for pivotally connecting the knuckle-pin bearing indicated in broken lines at 38 to the axle extension. The axle stub is indicated in broken lines at 39.

It is clear that the only differences between this form of the invention and that shown in Figs. 1 to 6 are those which adapt the invention for use with an axle of which the pin bearings are provided in pairs, instead of singly as in the form of the invention first described, and the steering knuckle is provided with a single knuckle-pin bearing instead of a pair of spaced knuckle-pin bearings as in the first described form of the invention.

I claim:

1. In vehicle construction, the combination with an axle having a knuckle-pivot bearing, of an axle extension provided with a bore to register with the bore of the bearing, and having a curved portion fitting one side of the knuckle-pivot bearing, fastening means passing through the registering bores, and a knuckle-pivot bearing on the extension adapted to receive the pivot of a steering knuckle.

2. In vehicle construction, the combination with an axle having a knuckle-pivot bearing, of an axle extension having a curved portion fitting one side of said bearing, means fastening the extension to said bearing, and a knuckle-pivot bearing on the extension adapted to receive the pivot of a steering knuckle.

3. In vehicle construction, the combination with an axle having a knuckle-pivot bearing, of an axle extension fitting one side of the bearing, means fastening the extension on the axle, and a knuckle-pivot bearing on the extension adapted to receive the pivot of a steering knuckle.

4. In vehicle construction, the combination with a flanged axle having a knuckle-pivot bearing, of an axle extension provided with flanges embracing the flanges of the axle, said extension having a bore to register with the bore of the bearing, a bolt passing through the registering bores, and a bolt extending through the webs of the axle and axle extension.

Signed at Santa Ana, Calif. this 28th day of December, 1920.

HEBER F. TOWNER.

Witnesses:
SULLY RUSSO,
EUGENE A. ROBINSON.